United States Patent
Eggert

(10) Patent No.: US 11,503,425 B2
(45) Date of Patent: Nov. 15, 2022

(54) METHOD FOR CHECKING THE ASSOCIATION OF RADIO NODES AND OF OBJECTS WITH A RADIO ENVIRONMENT

(71) Applicant: METIRIONIC GMBH, Dresden (DE)

(72) Inventor: Dietmar Eggert, Dresden (DE)

(73) Assignee: Metirionic GmbH, Dresden (DE)

( * ) Notice: Subject to any disclaimer, the term of this patent is extended or adjusted under 35 U.S.C. 154(b) by 181 days.

(21) Appl. No.: 16/907,795

(22) Filed: Jun. 22, 2020

(65) Prior Publication Data

US 2020/0408868 A1 Dec. 31, 2020

Related U.S. Application Data

(63) Continuation of application No. PCT/EP2018/000585, filed on Dec. 21, 2018.
(Continued)

(30) Foreign Application Priority Data

Dec. 21, 2017 (DE) ...................... 10 2017 011 879.5

(51) Int. Cl.
*H04W 4/02* (2018.01)
*G01S 5/02* (2010.01)
(Continued)

(52) U.S. Cl.
CPC ................. *H04W 4/02* (2013.01); *G01P 1/00* (2013.01); *G01P 15/08* (2013.01); *G01R 33/07* (2013.01);
(Continued)

(58) Field of Classification Search
CPC ......... H04W 4/02; H04W 4/40; H04W 24/10; G01P 1/00; G01P 15/08; G01R 33/07;
(Continued)

(56) References Cited

U.S. PATENT DOCUMENTS 3,243,812 A 3/1966 Williams
8,405,543 B2 3/2013 Kluge et al.
(Continued)

FOREIGN PATENT DOCUMENTS

DE 10 2009 060 591 A1 7/2010
DE 10 2009 060 593 A1 7/2010
(Continued)

OTHER PUBLICATIONS

Olafsdottir et al., "On the Security of Carrier Phase-Based Ranging," SIMPAR Intl Conf on Sim Modeling & Programming for Autonomous Robots, Lecture Notes in Comp Sci, pp. 490-509 (Aug. 25, 2017).

*Primary Examiner* — Siu M Lee
(74) *Attorney, Agent, or Firm* — Muncy, Geissler, Olds & Lowe, P.C.

(57) ABSTRACT

A method for checking the association of radio nodes and objects to a radio environment with a radio node set having at least three radio nodes spaced apart from one another, each with a radio interface and its separate timer, wherein at least two radio nodes are reference radio nodes with known distances from one another and at least one radio node is a test radio node, the association of which with the radio environment of the reference radio node is checked. During a measuring process, signals are emitted and received by radio nodes of the radio node set, wherein at least two radio nodes of the radio node set operate as transceivers and at least one radio node exclusively operates as a transmitter or exclusively operates as a receiver or a transceiver.

13 Claims, 6 Drawing Sheets

Related U.S. Application Data

(60) Provisional application No. 62/622,689, filed on Jan. 26, 2018.

(51) Int. Cl.

| | | |
|---|---|---|
| *G01S 5/06* | (2006.01) | |
| *G01S 5/14* | (2006.01) | |
| *G01S 13/74* | (2006.01) | |
| *H04B 1/525* | (2015.01) | |
| *H04W 24/10* | (2009.01) | |
| *G01P 1/00* | (2006.01) | |
| *G01P 15/08* | (2006.01) | |
| *G01R 33/07* | (2006.01) | |
| *G01S 13/50* | (2006.01) | |
| *H04B 1/06* | (2006.01) | |
| *H04B 1/38* | (2015.01) | |
| *H04L 5/00* | (2006.01) | |

(52) U.S. Cl.
CPC .......... *G01S 5/0273* (2013.01); *G01S 5/0289* (2013.01); *G01S 5/06* (2013.01); *G01S 5/14* (2013.01); *G01S 13/50* (2013.01); *G01S 13/74* (2013.01); *H04B 1/06* (2013.01); *H04B 1/38* (2013.01); *H04B 1/525* (2013.01); *H04L 5/0048* (2013.01); *H04W 24/10* (2013.01)

(58) Field of Classification Search
CPC ........ G01S 13/50; G01S 13/74; G01S 13/762; G01S 13/765; G01S 5/0252; G01S 5/0273; G01S 5/0289; G01S 5/06; G01S 5/14; H04B 1/06; H04B 1/38; H04B 1/525; H04L 5/0048; G07C 9/00309; G07C 2009/00555

See application file for complete search history.

(56) References Cited

U.S. PATENT DOCUMENTS

| | | |
|---|---|---|
| 8,406,144 B2 | 3/2013 | Sachse et al. |
| 8,442,719 B1 * | 5/2013 | Nowottnick ....... G07C 9/00309 701/49 |
| 8,644,768 B2 | 2/2014 | Kluge et al. |
| 8,755,300 B2 | 6/2014 | Sachse et al. |
| 8,965,301 B2 | 2/2015 | Kluge et al. |
| 9,274,218 B2 | 3/2016 | Kluge et al. |
| 9,479,952 B2 | 10/2016 | Sachse et al. |
| 10,416,301 B2 | 9/2019 | Kluge et al. |
| 10,466,350 B2 | 11/2019 | Kluge et al. |
| 11,051,124 B2 * | 6/2021 | Eggert ................. H04L 5/0048 |
| 2005/0228613 A1 | 10/2005 | Fullerton et al. |
| 2006/0094350 A1 * | 5/2006 | Ishimura ............ G07C 9/00309 342/127 |
| 2010/0167661 A1 | 7/2010 | Kluge et al. |
| 2014/0375420 A1 | 12/2014 | Seiberts et al. |
| 2018/0178758 A1 * | 6/2018 | Yamaguchi .............. G07C 9/20 |
| 2019/0180542 A1 * | 6/2019 | Geier ....................... H04K 3/28 |
| 2019/0389427 A1 * | 12/2019 | Brilion ................. B60R 25/245 |
| 2020/0005571 A1 * | 1/2020 | Han ...................... B60R 25/245 |

FOREIGN PATENT DOCUMENTS

| | | |
|---|---|---|
| DE | 10 2009 060 505 B4 | 9/2011 |
| DE | 10 2009 060 592 B4 | 6/2012 |

* cited by examiner

METHOD FOR CHECKING THE ASSOCIATION OF RADIO NODES AND OF OBJECTS WITH A RADIO ENVIRONMENT

This nonprovisional application is a continuation of International Application No. PCT/EP2018/000585, which was filed on Dec. 21, 2018, and which claims priority to German Patent Application No. 10 2017 011 879.5, which was filed in Germany on Dec. 21, 2017, and to U.S. Provisional Application No. 62/622,689, which was filed on Jan. 26, 2018 and which are all herein incorporated by reference.

BACKGROUND OF THE INVENTION

Field of the Invention

The present invention relates to a method for checking the association of radio nodes and of objects with a radio environment having a radio node set of at least three radio nodes spaced apart from each other.

Description of the Background Art

There are a variety of methods for determining distance based on the measurement of phases and phase differences of reference signals in the frequency domain. The basic principle has been known for more than 50 years, for example from U.S. Pat. No. 3,243,812. The method has been used in various applications for decades. In addition to a large number of publications, there are also a number of patents.

Alternative methods for measuring the distance between two radio nodes are known from DE 10 2009 060 505 B4, DE 10 2009 060 593 A1, DE 10 2009 060 592 B4 or also DE 10 2009 060 591 A1. An extensible position measuring system is known from US20050228613 A1.

Authentication methods within wireless electronic access systems typically utilize cryptologic methods. Mostly, all authorized parties have knowledge of a key as well as authentication algorithms to be used. Various concepts have been developed to ward off relay attacks on such wireless access systems. Methods based on distance determination are typically referred to as distance bounding. A disadvantage is that nowadays manipulation of the distance determination is also possible.

A distance bounding method for detecting relay attacks based on signal vector measurements can be found in A. R. S. C. Hildur Olafsdottir, "On the Security of Carrier Phase-based Ranging", https://www.researchgate.net/publication/254008732_Physical-layer_attacks_on_chirp-based_ranging_systems, Proceedings of Cryptographic Hardware and Embedded Systems (CHES).

SUMMARY OF THE INVENTION

It is therefore an object of the present invention to provide a device which further develops the prior art.

In an exemplary embodiment, a method is provided for checking the association of radio nodes and of objects with a radio environment having a radio node set of at least three radio nodes spaced apart from one another is proposed, each radio node of the radio node set having a radio interface and its own timer and in each case a time offset being between the timers of the radio nodes. At least two radio nodes of the radio node set are reference radio nodes, wherein a distance between each reference radio node and the further reference radio nodes is known and the reference radio nodes form a reference system with a radio environment. At least one radio node of the radio node set is a test radio node, wherein an association of the at least one test radio node with the radio environment of the reference system is checked.

The method comprises a measuring process, an evaluation process and a comparison process.

During the measuring process, signals are transmitted and received by radio nodes of the radio node set, wherein during the measuring process at least two radio nodes of the radio node set operate as transceivers and at least one radio node during the measuring process exclusively operates as a transmitter or exclusively operates as a receiver or a transceiver.

The evaluation process comprises a first evaluation step and a second evaluation step, wherein in the first evaluation step, a system transfer function between two radio nodes of the radio node set and/or a time offset between the timers of two radio nodes of the radio node set is determined by means of received signals, and in the second evaluation step, at least one distance information between an object of the radio environment of the two radio nodes and the two radio nodes and/or at least one distance information between the two radio nodes is determined from the first evaluation step on the basis of the system transfer function and/or the time offset.

In the evaluation process, the first evaluation step and the second evaluation step for at least one pair of reference radio nodes are performed at least once in a first pass and the first evaluation step and the second evaluation step for a test radio node and a reference radio node are performed at least once in a second pass.

In the comparison process, at least one result of the first pass is compared with at least one result of the second pass, and a positive or negative decision is made with regard to the association of the test radio node and/or the object with the radio environment of the reference system on the basis of at least one result of the comparison process.

The distances between the reference radio nodes can be known at least relative to one another, while an absolute or at least relative position of the test radio node is not known. The reference radio nodes form the basis for a reference coordinate system via their distance relationship. The position of the test radio node and/or of objects in the environment is initially not known within this coordinate system and can be determined by means of the method.

It goes without saying that the radio nodes of the radio node set do not have to differ, apart from the fact that at least relative distance information is available for each reference radio node. In particular, each radio node comprises, for example, a receiving unit, a transmitting unit, a signal processor and at least one antenna.

If a radio node comprises a plurality of antennas, the transmission signal is emitted by one of the antennas or by several antennas. For example, the antennas sequentially emit one after the other during a transmission period. For this purpose, the transmission period is subdivided, for example, into several time windows, one of the antennas in each case transmitting during a time window. It is understood that the reception of the signals can also be correspondingly organized.

In addition to the radio signals, i.e., the signals transmitted or received during the measuring process, data signals can be exchanged via the same interface or by means of the same transmitting unit and the same antennas. The further data transfer takes place in the same frequency domain as the signals of the measuring process or in a different frequency domain. Alternatively, each radio node has a further data interface, wherein the further data interface is also wired or wireless. The further data transfer via the same or another interface makes it possible to exchange data, such as that of determined signal vectors, as well as the coarse time synchronization of the radio nodes.

The functionality of the radio nodes during the measuring process can be independent of the assignment of the radio node to the group of reference radio nodes or to the group of test radio nodes. In principle, it is possible for a test radio node to operate as a transceiver in a first pass of the method according to the invention and, in a second pass, operate exclusively as a transmitter or exclusively as a receiver. The same also applies to the reference radio nodes.

All radio nodes which both transmit and receive during the measuring process are referred to as transceivers. Radio nodes which operate exclusively in a transfer mode during the measuring process and transmit at least one transmission signal are referred to as transmitters. By contrast, radio nodes that operate exclusively in a receive mode during the measuring process and receive at least one signal are referred to as receivers.

Time offsets between the individual timers of the radio nodes involved and/or the system transfer functions are determined by means of the evaluation process. A prerequisite is that a coherence between the signals is provided at least within one measurement cycle.

In the first pass of the evaluation process, at least one exchange of radio signals within the reference system, i.e., between at least two reference radio nodes, is evaluated. Thus, signals emitted by a reference radio node and received by a reference radio node are evaluated in order to determine the system transfer function and/or the time offset. The evaluation step in the first pass is preferably repeated several times and in particular for each repetition for another pair of reference radio nodes of the radio node set.

In the second pass of the evaluation process, an exchange of radio signals between the test radio node and a reference radio node, i.e., at least two signals transmitted by the test radio node and received by the reference radio node, or at least two signals transmitted by the reference radio node and received by the test radio node or at least two signals exchanged between the test radio node and a reference radio node are evaluated.

A function describing the transmission properties between two radio nodes is generally referred to as a system transfer function, i.e., a function which describes the transmission of a signal via a propagation medium.

The so-called transfer function is determined in the frequency domain, which maps the transmission properties between the radio nodes in the frequency domain. Often, the transfer function is also called system response.

In the time domain, the term channel impulse response is also common for the transmission behavior of a propagation medium.

It is understood that the recorded values from the frequency domain can be transformed into the time domain by means of a Fourier transform and vice versa.

In addition, an eigenvalue method or a signal classification method is also used.

The transmission properties contained in the system transfer functions include both the direct transfer path between two radio nodes and indirect transfer paths that are generated by reflection on objects and/or by refraction and/or by diffraction. In this way, all objects which influence the transfer path by reflection and/or refraction and/or diffraction are contained in the system transfer functions or are extractable from the system transfer functions.

In order to be able to better resolve the plurality of transfer paths, it is advantageous to repeat the measurement cycle more frequently and to change the carrier frequency in frequency steps over a bandwidth (predetermined frequency domain), as a result of which a greater amount of support points in the frequency domain is determined.

The bandwidth of the predetermined frequency domain of the signals determines the ability of the method to resolve signal paths having different lengths. If a frequency-based measuring process is involved, the frequency step size determines the range over which a distance can be unambiguously determined and at the same time limits the size of the unambiguously determinable time offsets.

Distance information between radio nodes can be determined on the basis of a direct transfer path. As a rule, it is not possible to specify a clear position in two-dimensional or three-dimensional space. Rather, only an ambiguous distance can be determined, i.e., only a line or surface with equal distances or equal distance sums or equal distance differences.

The distance information is therefore typically an isoline or isosurface of a distance or an accumulated distance or a distance difference relative to one or two radio nodes. In two dimensions, for example, a circle around a radio node as an isoline comprises all points at the same distance. In three-dimensional space, the isosurface is correspondingly designed as a spherical surface. If only the sum of the distances between two radio nodes and an object is known, an elliptical isoline or an ellipsoid can be determined as distance information around the two radio nodes, which comprises all the same distances or all the same distance sums to the object. If distance differences are determined, hyperbolas or hyperboloids are obtained as determinable isolines or isosurfaces.

Since objects cause indirect transfer paths through reflection, distance information, i.e., an isoline or an isosurface of a distance or an accumulated distance or a distance difference between the radio nodes and this object can be determined from the corresponding indirect transfer path. The information about the environment, for example the number and distances of objects obtained from the analysis of the system transfer functions, is referred to as the radio environment.

The comparison process comprises at least one, preferably several, comparisons between determined variables and represents a plausibility test.

By analyzing the indirect transfer paths within the reference system, a radio environment of the reference system or properties of the radio environment, which are determined by the number, type and position of objects in the environment, is detected. By evaluating the indirect transfer paths between the test radio node and the reference radio node, an extended radio environment, i.e., in particular also the number, type and position of objects in the vicinity of the test radio node, is detected.

If the test radio node is located in the vicinity of the reference system, the determined properties of the radio environments of the reference system and the extended radio environment demonstrate a high degree of agreement. The test radio node is then located in the same environment as the reference system. A deviation between the radio environments indicates that the test radio node is not located in the same radio environment and therefore not in sufficient spatial proximity to the reference system.

Additional evaluation of the direct transfer paths between the test radio nodes and the reference radio nodes results in information about the distance between the test radio node and the reference system.

Typically, the test radio node is located on at least one object reflecting signals, for example a person carrying a key comprising the test radio node. This results in two possibilities for determining information on the distance between the test radio node and the reference system. On the one hand, direct distance information, i.e., an isoline or isosurface of the distance/accumulated distance/distance difference of the test radio node can be determined from the direct transfer path of a system transfer function between the test radio node and a radio node of the reference system. On the other hand, indirect distance information about the test radio node located on the object, i.e., an isoline or isosurface of the distance or the accumulated distance or the difference in distance of the corresponding object from the reference system, can be determined from the indirect transfer path of the system transfer function generated by reflection on this object between two reference radio nodes. A deviation between the determined distance information indicates that the test radio node is not on the object, as assumed.

A comparison of known distances between reference radio nodes with corresponding distances determined from system transfer functions can also serve as a plausibility test.

It is understood that all the values or signal vectors transmitted using the method according to the invention can be protected accordingly by suitable encryption mechanisms in order to protect the processes taking place. For example, each signal vector can be assigned a time varying sequence of numbers, which is known only to the participating or authorized radio nodes a priori.

The method according to the invention makes it possible to perform a plausibility test on the basis of various comparisons. In particular, a plurality of relationships between the radio nodes can be determined without additional technical complexity and purely based on the signal and system transfer function analysis. This creates a large database for the plausibility test, which can comprise both static information about the environment and also dynamic motion profiles of time tracking of the corresponding results.

The expansion of the time and distance bounding concept by the method according to the invention to a radio environment identification (radio environment ID) enables novel security concepts. The known method is particularly suitable for expanding techniques such as authentication via radio data communication with corresponding cryptologic methods, round-trip time measurement with a small channel bandwidth using regular data frames on a plurality of radio channels or the integration of additional sensors. The method is suitable, for example, as an alternative or supplement for access systems, for example in the automotive industry, and can also be used in a simple manner with further radar systems, such as distance radar, parking sensor systems, inertial sensor technology for orientation, temperature, air pressure, etc. on the automobile-side or with inertial sensors on the key-side.

The method according to the invention enables robust and efficient identification and defense against relay attacks by detecting and analyzing the surroundings of the radio nodes involved. The method can be easily integrated in established standards for wireless communication, such as Bluetooth, Bluetooth Smart or Zigbee. It also helps reduce the complexity of integration in widespread solutions for mobile communication, such as "smart phones" and tablets.

In a first further development, the measuring process comprises at least two measurement cycles, wherein for each measurement cycle, a transmission signal having a carrier frequency is transmitted sequentially by each transceiver and the emitted transmission signal is at least received by the further transceivers during a reception period, the transmission signals of the transceiver are coherent with one another at least during a measurement cycle, the carrier frequency of each measurement cycle differs from the carrier frequencies of all further measurement cycles, provided that a radio node operates as a transmitter during the measuring process, the at least one transmitter in each case transmits a transmission signal with a carrier frequency during at least one additional transmission period, before or during or after one of the measurement cycles, wherein the transmission signal is received by the transceivers.

It is understood that, if present, each receiver receives all or at least some of the signals transmitted by the transceivers during the at least two measurement cycles.

If the further radio node also operates as a transceiver during the measuring process, this transceiver takes part in the at least two measurement cycles as a further transceiver.

If the further radio node operates as a transmitter, it is understood that the additional transmission period and the transmission periods of the transceivers do not overlap nor do the radio nodes transmit at the same time. The additional transmission period is integrated into one or more or all measurement cycles, so that the additional transmission period is after one of the transmission periods of the transceivers and before a further transmission period of a further transceiver. Alternatively, the additional transmission period is before and/or after one or several or all of the measurement cycles. The transmitter preferably transmits once during each measurement cycle, wherein a carrier frequency of the transmission signal of the transmitter takes on a different value for each measurement cycle. The carrier frequencies of the transmission signals of the transmitters are particularly preferably changed in the same way as the carrier frequencies of the transceivers.

The measurement cycle is preferably repeated a plurality of times, wherein the carrier frequency is changed within a predetermined frequency domain with each repetition. For example, a so-called frequency sweep is carried out. The transmission signals are preferably unmodulated.

The radio node set can comprise at least four radio nodes, with at least three radio nodes of the radio node set operating as transceivers during the measuring process.

The radio node set can comprise at least four radio nodes, with at least two radio nodes of the radio node set operating exclusively as transmitters or exclusively as receivers or as transceivers during the measuring process.

The radio node set can comprise at least four radio nodes, with at least three radio nodes of the radio node set forming the reference system as reference radio nodes.

It is understood that the three above examples can also be combined in any manner, wherein the minimum number of radio nodes included in the radio node set increases accordingly.

In a further development, within each measurement cycle, the second transmission signal emitted and each subsequent transmission signal are formed at least from a part of the signals received during the same measurement cycle. As a result, information about previously received transmission signals and, accordingly, about previous transfer paths are already transmitted by the further transmission signals. This makes it possible, for example, for the first transmitting transceiver to determine the two-way system transfer function based on the received second transmission signal. A further possibility is that information about the time offset is transmitted with the second signal, as a result of which a radio node receiving the second signal can determine a one-way transfer function from the received signal vector and the time offset.

The measurement cycle can be repeated a plurality of times during the measuring process, wherein for each repetition the carrier frequency of the transmission signals assumes a predetermined value within the frequency domain and the received signals are determined within a measurement frequency domain.

For example, a frequency sweep is carried out, wherein the carrier frequency is in each case increased or reduced by a constant value within the predetermined frequency domain for each repetition of the measurement cycle during the measuring process. A sweep can be realized with little implementation effort. It is usually easier to maintain phase relationships across a variety of smaller frequency steps. However, due to legal regulations, this embodiment is restricted for many applications in the admissible transmission power.

A more irregular change in the carrier frequency is also known as frequency hopping. The different frequencies or values for the carrier frequency for each individual repetition are stored, for example, in a lookup table or are depend on a predefined mathematical function. For example, frequency hopping can be carried out on the basis of pseudo-noise-like sequences, which results in a high level of robustness against sources of interference. At the same time, this embodiment of the method allows for the use of greater transmission power while complying with a wide variety of legal regulations and regulatory provisions. It is therefore possible to expand the use of the method to greater ranges.

In a further development, each transmission signal has a bandwidth in the transmission period, the bandwidth being at most 1% of the measurement frequency domain.

A distance information to a plurality of objects can be determined in the evaluation process both in the first pass and in the second pass, and the distance information from the first pass is in each case compared to the corresponding distance information from the second pass. If a plurality of or all indirect transfer paths are evaluated and thus several or all objects in the environment are identified, these can be used for the comparison, which increases the reliability of the plausibility test.

At least the measuring process and the evaluation process can be repeated a plurality of times and several system transfer functions are determined, with a first motion profile of at least one object or of the test radio node being determined based on the results of the several first passes, and a second motion profile of the object or of the test radio node is determined based on the results of the several second passes and the first motion profile is compared with the second motion profile in the comparison process. Over time, motion profiles of one or more objects can be determined and used for plausibility tests.

According to a further development, a first motion profile of the test radio node is determined by means of an inertial sensor and is compared in the comparison process with a second motion profile, wherein the second motion profile is determined on the basis of the results of a number of first passes and/or on the basis of the results of a number of second passes.

An inertial sensor is a sensor that enables independent position determination. For example, an orientation is determined using a Hall sensor; linear or rotational accelerations are determined, for example, by means of MEMS. Pressure and/or temperature measurements are also used to determine position.

At least the measuring process and the first pass of the evaluation process can be repeated a plurality of times, and in the comparison process the results of the several first runs are compared with at least one result of the second pass.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
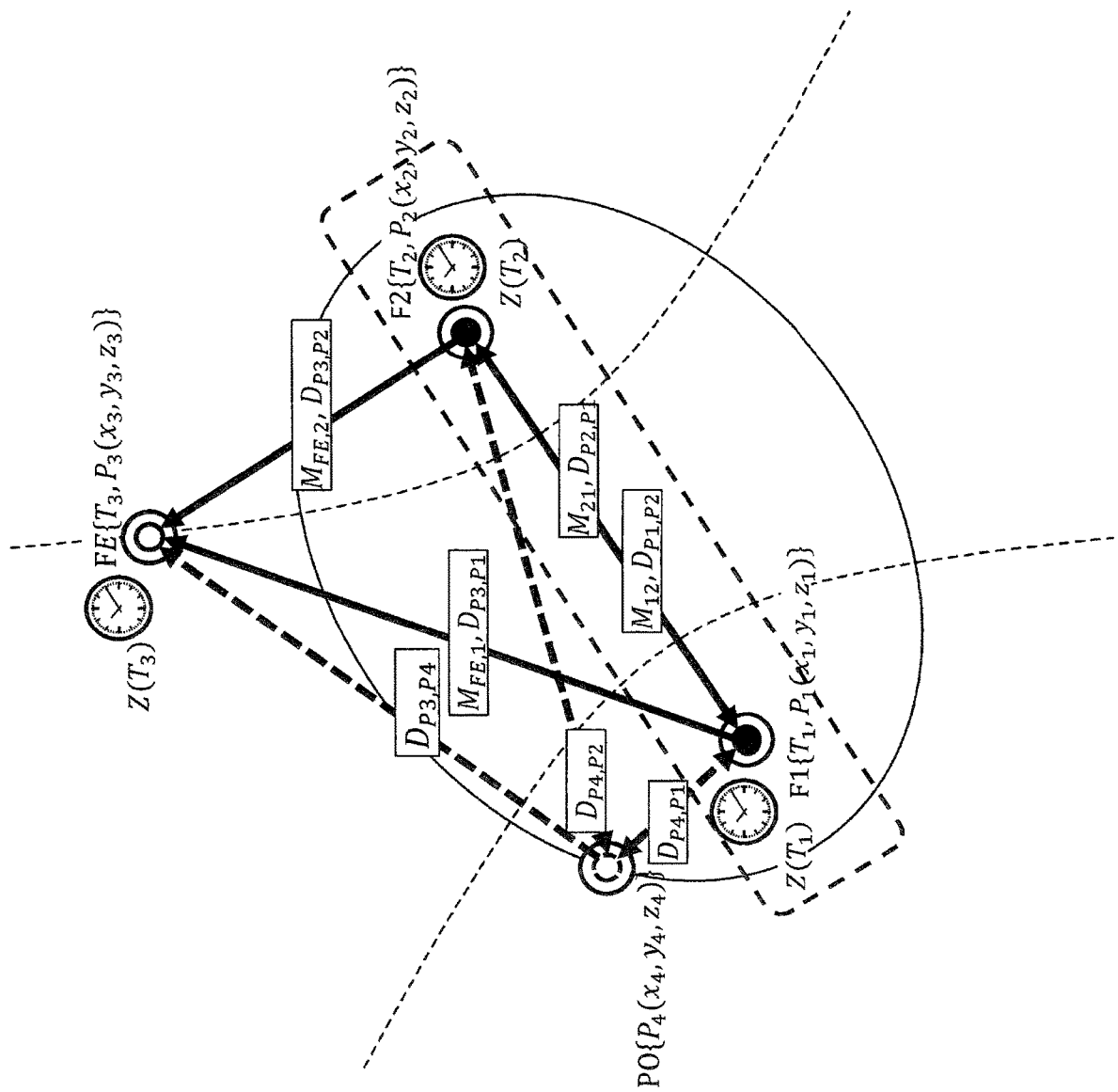
FIG. 1 shows a reference system and test radio node.

1 Definition and Modeling of a Radio Environment

The content of the method according to the invention is to check a test radio node with regard to its association (presence) within the radio environment of a system of reference radio nodes. For this purpose, the transmission behavior between the radio nodes (test radio nodes and reference radio nodes) is to be determined and used to determine the positional relationships of radio nodes and objects.

A radio environment is a space around a system of reference radio nodes, the properties of which are determined by physical (e.g., free-space path loss), structural (e.g., walls) or system-related boundary conditions (e.g., maximum output power). The reference radio nodes are spatially distributed; the distances from each other or the position to one another is known. Thus, the reference radio nodes form a reference system coordinate system by means of their positional relationships.

Radio nodes with their antennas as sources and sinks of electromagnetic radiation energy: With the help of their antennas (also emitters), the radio nodes are able to convert electrical signals into electromagnetic waves and, conversely, convert the energy of an electromagnetic wave into an electrical signal, which can then be further processed.

In the sense of the other embodiments, the radio nodes with their antennas, which are small in comparison to the dimensions of the space or the objects, are regarded as point sources and point sinks of electromagnetic energy.

The radio nodes in the sense of the method each have their own time base T, with which a timer Z (T) controls all processes and on the basis of which transmission signals are generated and received signals are evaluated. When performing the method, the time and frequency offsets must be observed, and their effects corrected. The details of this correction are not the subject of this description. For the further considerations, it is assumed that this correction has been implemented.

Propagation of electromagnetic waves: The propagation of electromagnetic waves is determined by the electric and magnetic properties of the medium in which the waves propagate. Electromagnetic waves radiate from the antennas in a straight line. The propagation along a path can be mapped by a linear time-invariant system with a transfer function $$H(j\omega) = \sum_{i=1}^{n} a_i \cdot e^{-j\omega \frac{d_i}{c}}.$$

A path is characterized by the amplitude response $a=e^{-\alpha d}$ (first term) and the phase response $$-j\omega \frac{d_i}{c}.$$

$\alpha$ describes an attenuation coefficient and d describes the electrical length of the path between the antennas. The phase response is largely determined by the quotient $$\frac{d}{c}.$$

This is also called group delay $t_g$, wherein c is the speed of light. The term $$e^{-\frac{wt}{g}}$$

describes the delay of a wave by $t_g$ in the frequency domain.

In a radio environment, airborne propagation is of particular interest, wherein the waves can be reflected, refracted, diffracted and scattered at interfaces, while interfaces are to be understood as transitions to bodies having properties other than air, which are also referred to below as objects.

Objects are bodies with electrical material properties other than air, which essentially reflect incident electromagnetic waves but also influence the propagation behavior through diffraction, scattering or refraction. Objects are not able to generate electromagnetic waves, nor can they convert electromagnetic energy into electrical signals.

It should be noted that phase shifts can occur at interfaces. In addition, the passage through a body or an object influences the direction of propagation through refraction and the speed of propagation of a wave. In the sense of the further considerations, these effects will not be discussed further since they would make the selected models more complex without fundamentally changing the overall message.

Basically, with regard to the propagation of radiation between two points, a distinction is made between the propagation along the direct path and the propagation along indirect paths extending along objects through reflection. In the other representations, the propagation of a wave is represented by a beam and thus the point of reflection (of the beam) is reduced to a point on the surface of the object. For clarity of presentation, the objects are reduced to the point-shaped reflection point, which implicitly includes compliance with the continuity conditions at the interfaces.

Indirect paths are longer than the direct path; the electromagnetic wave is generated with the help of an antenna and propagates indirectly via a reflection point to the receiving antenna, where part of the energy is converted into an electrical signal.

At the receiving antenna, the field distribution is created as a superposition of the energy that spreads over each path. In n propagation paths, the result is the channel transfer function as a superposition of the channel transfer functions of the individual propagation paths $$H(j\omega) = a \cdot e^{-j\omega \frac{d}{c}}.$$

If you now consider the corresponding transformation of the channel transfer function H (j$\omega$) in the time domain, then the channel impulse response is created:

a. $h(t)=F^{-1}\{H(j\omega)\}$ b. $h(t)=\Sigma_{i=1}^{n} a_i \cdot \delta(t-t_{g,i})$ It can be seen that the individual signal paths, attenuated by the factor $a_i$, are mapped into the channel impulse response as single pulses $\delta(t)$, each being delayed by the group delay $t_{g,i}$.

With the presented properties, a radio environment in the sense of the transmission properties can be modeled by a spatial distribution of radio nodes and objects in the space, wherein:

the transmission behavior between the antennas of the radio nodes is determined by a linear, time-invariant system of propagation paths, the propagation paths are shown as beams whose transfer function is determined by the propagation velocity and the length of the path, radio nodes with their antennas are reduced to points in a coordinate system, wherein the antennas operate as sources and sinks of electromagnetic energy and their supply or received signals form the input as well as the output quantities of the linear time-invariant transfer system.

Objects are reduced to points in a coordinate system and in each case map the positions of the reflection of the corresponding propagation beam or path.

In the sense of the method, a measuring process is assumed in which the corresponding input signals can be generated within an environment with radio nodes and objects by using the radio nodes, and in which the corresponding output signals can be made available for further processing.

This measuring process can run in the time domain as well as the frequency domain. The basis for obtaining channel impulse responses is created in the time domain, preferably by using impulse-like signal forms. In the frequency domain, the basis for obtaining channel transfer functions is preferably created by using ramp frequency signals. The derivation of the system transfer functions $M_{ij}=F(H_{ij} (j\omega); T_{offset,ij}, f_{offset,ij})$ takes place in a first evaluation step after the measuring process in the frequency domain, or the equivalent representation takes place in the time domain $m_{ij}=f(h_{ij}(t); T_{offset,ij}, f_{offset,ij})$ with the corresponding channel impulse responses $h_{ij}$ (t) or channel transfer functions $H_{ij}$ (j$\omega$). The channel impulse responses or channel transfer functions describe the propagation behavior of an electromagnetic wave from the position $P_j$ ($x_j$, $y_j$, $z_j$) of the radio node j, where it is generated by a point source, to the position $P_i$ ($x_i$, $y_i$, $z_i$) of the radio node i, where energy of this electromagnetic wave is converted by the antenna (punctiform energy sink) of the radio node i into an electrical signal and is processed further by the radio node. The corresponding time offsets result from the offset between the time bases $T_i$ and are determined by $T_{offset,ij}=T_i-T_j$. In this case, $T_{ij}=-T_{ji}$.

For the purposes of further considerations, first the measuring process and the first evaluation step are completed, and the system transfer function for the radio nodes involved is available. The number and length of the paths or accumulated paths or differential paths have been determined using known methods. An evaluation option utilizes the representation of the system transfer function in the time domain—the channel impulse response—in which the paths can be derived directly as Dirac impulses, which are shifted in time with the signal delays. If the measuring process was performed in the frequency domain, the equivalent representation in the time domain must first be determined.

2 Derivation of Position Information from Distance Information

Below, the derivation of position information on the basis of the functions or determined paths described above shall be addressed.

FIG. 1 shows a corresponding minimal configuration of a radio node set of three radio nodes F1, F2 FE and an object PO in two dimensions. An interpretation of the method within a space is expressly part of the method. For the sake of clarity, the presentation has been reduced to a flat image. The radio nodes F1 and F2 operate as transceivers. The radio node FE as a further radio node operates in one of three different operating modes during the measuring process. In mode 1, the further, here third radio node FE operates like the transceivers F1 and F2 as a transceiver. In mode 2, the further radio node FE operates exclusively as an emitter or a transmitter and in mode 3, only as a receiver. It applies to all radio nodes that the transmission operation only takes place in assigned time domains and that two radio nodes of the radio node set do not transmit at the same time.

The four units (three radio nodes and one object) are shown as double circles, with the inner circle symbolizing the differences. A dashed inner circle represents an object. A black filled inner circle represents a radio node F1 or F2, which operates exclusively as a transceiver. A not-filled inner circle represents the further radio node FE, which operates in one of three different modes.

The distance from one another is known for two of the radio nodes of the radio node set. These radio nodes are reference radio nodes and form a reference system. They are at different positions in the space. They form the basis for the introduction of a reference coordinate system, the dimensions of which are determined by the number of reference radio nodes with different positions in the space and which allow for the derivation of positional relationships.

According to the assumptions presented, the units are reduced to points in the space $p_i$ ($x_i$, $y_i$, $z_i$; these are located in the center of the associated circles. The propagation paths are represented by rays that begin and end at the points pertaining to the units. Continuous rays indicate direct propagation paths between radio nodes. Dashed rays indicate propagation paths that lead to an object or come from an object. The electromagnetic wave is reflected on the object in order to be processed by the radio nodes that are in the receive mode. Rays with two arrows indicate that the propagation path is traversed in both directions. Rays with only one arrow indicate that the propagation path is only traversed in one direction. From the many possible configurations, 3 will be highlighted.

2.1 Configuration: Reference Nodes: FE, F2 Test Node: F1

In the first configuration, the further radio node FE operates exclusively in a receive mode. Reference radio nodes are the further radio node FE and the second transceiver F2, the positions or distances of which are known. The test radio node is the radio node F1 operating as a transceiver. In this configuration, all time offsets between the radio nodes can be determined and thus, the four system transfer functions $M_{12}$, $M_{21}$, $M_{FE,1}$, $M_{FE,2}$ can be determined in the frequency domain, or $m_{12}$, $m_{21}$, $m_{FE,1}$, $m_{FE,2}$ can be determined in the time domain.

Since the radio nodes have been reduced to points, there is no reflection at the radio nodes. Thus, each of said system transfer functions contains the information about two propagation paths $W_1$ and $W_2$, wherein $W_1$ is the direct path with the length $D(W_1)$ between the radio nodes and $W_2$ is the indirect path with the length $D(W_2)$ between the respective radio nodes via a reflection on the object at point $P_4$.

$M_{FE,1}$:
$M_{FE,1:W1}$ ($H_{FE,1:W1}(j\omega);T_{off:FE,1}$) With $W_1$: $P_1 \to P_3$
$\to D_{FE,1}$ ($W_1$)=$D_{P3,P1}$
$M_{FE,1:W2}$ ($H_{FE,1:W2}(j\omega);T_{off:FE,1}$) With $W_2$: $P_1 \to P_4 \to P_3$
$\to D_{FE,1}$ ($W_2$)=$D_{P4,P1}+D_{P3,P4}$ $M_{21}$:
$M_{21:W1}$ ($H_{21:W1}M;T_{off:21}$) with $W_1$: $P_1 \to P_2$
$\to D_{21}$ ($W_1$)=$D_{P2,P1}$
$M_{21:W2}$ ($H_{21:W2}M;T_{off:21}$) with $W_2$: $P_1 \to P_4 \to P_2$
$\to D_{21}$ ($W_2$)=$D_{P4P1}+D_{P2P4}$ $M_{FE,2}$:
$M_{FE,2:W1}$ ($H_{FE,2:W1}(j\omega);T_{off:FE,2}$) with $W_1$: $P_2 \to P_3$
$\to D_{FE,2}$ ($W_1$)=$D_{P3,P2}$
$M_{FE,2:W2}$ ($H_{FE,2:W2}(j\omega);T_{off:FE,2}$) with $W_2$: $P_2 \to P_4 \to P_3$
$D_{FE,2}$ ($W_2$)=$D_{P4,P2}+D_{P3,P4}$ $M_{12}$:
$M_{12:W1}$ ($H_{12:W1}(j\omega);T_{off:12}$) with $W_1$: $P_2 \to P_1$
$\to D_{12}$ ($W_1$)=$D_{P1,P2}$
$M_{12:W2}$ ($H_{12:W2}(j\omega);T_{off:12}$) with $W_2$: $P_2 \to P_4 \to P_1$
$\to D_{12}$ ($W_2$)=$D_{P4P1}+D_{P2P4}$ With the aid of the distances $D_{P1,P2}$ and $D_{P1,P3}$ determined from the direct paths, two circles result about the positions $P_2$ and $P_3$ with the radii $D_{P1,P2}$ and $D_{P1,P3}$, respectively. The position of the test radio node is located at the intersections of these two circles. Since there are two intersections, the position determination for the test node is not unambiguous in this configuration.

The position of the object can be determined via the indirect paths $D_{ij}$ ($W_2$). The length of the respective indirect paths forms the leg length sum of two legs of a triangle, each beginning at the position of the two radio nodes involved and ending at a common point, and which create an ellipse (in 3D, an ellipsoid) on the edge (in 3D, the surface) where the object is located. It is therefore only possible to determine the position of the object with respect to an isoline (in 3D, an isosurface) which has the shape of an ellipse. If only the reference nodes are used to determine the position of the object, then only one ellipse can be parameterized and thus used to determine the position. The ellipse has its focal points in the positions $P_2$ and $P_3$ of the reference radio nodes, the sum of the two legs of the triangle having the length $D_{FE,1}$ ($W_2$)=$D_{P4,P2}+D_{P3,P4}$. This ellipse is not shown within FIG. 1.

If the results found using the test node are also used to determine the position, the parameters for three ellipses with different focal points can be determined. The object is located at the intersection of the three ellipses:

1. Ellipse: focal points: $P_1$ and $P_2$, leg sum of the triangle $D_{2,1}(W_2) = D_{P4,P1} + D_{P2,P4}$
2. Ellipse: focal points: $P_1$ and $P_3$, leg sum of the triangle $D_{3,1}(W_2) = D_{P4,P1} + D_{P3,P4}$
3. Ellipse: focal points: $P_2$ and $P_3$, leg sum of the triangle $D_{3,2}(W_2) = D_{P4,P2} + D_{P3,P4}$ 2.2 Configuration: Reference Nodes: F1, F2 Test Node: FE In the second configuration presented, the further radio node FE is the test node and operates exclusively in the receive mode. The transceivers F1 and F2 are the reference nodes that form the reference system. The position of the radio nodes F1 and F2 is thus known. In this configuration, not all time offsets can be determined between the radio nodes and therefore only the two system transfer functions $M_{12}$, $M_{21}$ in the frequency domain or $m_{12}$, $m_{21}$ in the time domain can be fully determined.

The system transfer functions again contain the information about two propagation paths $W_1$ and $W_2$, wherein $W_1$ is the direct path with the length $D(W_1)$ between the radio nodes and $W_2$ is the indirect path with the length $D(W_2)$ between the respective radio nodes via a reflection on the object at point P4.

$M_{21}$:
$M_{21:W1}(H_{21:W1}(j\omega); T_{off:21})$ with $W_1$: $P_1 \to P_2$
$\to D_{21}(W_1) = D_{P2,P1}$
$M_{21:W2}(H_{21:W2}(j\omega); T_{off:21})$ with $W_2$: $P_1 \to P_4 \to P_2$
$\to D_{21}(W_2) = D_{P4P1} + D_{P2P4}$ $M_{12}$:
$M_{12:W1}(H_{12:W1}(j\omega); T_{off:12})$ with $W_1$: $P_2 \to P_1$
$\to D_{12}(W_1) = D_{P1,P2}$
$M_{12:W2}(H_{12:W2}(j\omega); T_{off:12})$ with $W_2$: $P_2 \to P_4 \to P_1$
$\to D_{12}(W_2) = D_{P4P1} + D_{P2P4}$ Since the distance between the radio nodes F1 and F2 is known, the result can only be used to check the measurement. With these functions, no further positional relationships for the test radio node can be generated directly:

Since both functions are closely related to each other due to the reciprocal channel behavior, the extractable information regarding the indirect path $W_2$ is equivalent. Thus, only the position information relating to an ellipse can be extracted from the results, namely: focal points of the ellipse: $P_1$ and $P_2$; leg sum of the triangle $D_{2,1}(W_2) = D_{P4,P1} + D_{P2,P4}$. The position of this ellipse is shown in FIG. 1.

It can be shown that instead of the system transfer functions $M_{FE,2}$, $M_{FE,1}$ in the frequency domain or $m_{FE,2}$, $m_{FE,1}$ in the time domain, the distance difference transfer function $H_{\Delta(FE,1; FE,2)}(j\omega)$ or its equivalent function $h_{\Delta(FE,1; FE,2)}(j\omega)$ can be determined in the time domain using the determined time offset $T_{offset,21} = -T_{offset,12}$. The components of this function include the differences in the delays of electromagnetic waves that propagate from F1 to the node FE, relative to the delays of electromagnetic waves that propagate from F2 to the node FE. The extractable delays of this function lead to differences in distance. $\Delta D(FE,1; FE,2) = D_{P3,P1} - D_{P3,P2}$. With this extracted difference in distance, a hyperbola in the surface (or a hyperboloid in 3D) can be determined with regard to the position information of the radio node FE. The parameters of this hyperbola are: focal points: $P_1$ and $P_2$ distance difference of the leg sum of the triangle, which begin in each case at the focal points and end on the hyperbola at one point $\Delta D(FE,1; FE,2) = D_{P3,P1} - D_{P3,P2}$. This hyperbola is shown in FIG. 1.

In this configuration, the position of the test node along a hyperbolic function in the space, and the position of the object on the edge of an ellipse in the space are limited. With regard to the association, the hyperbole is a particular challenge, since the space of possible positions also includes positions having great, absolute distances.

It can be shown that the test radio node's mode of operation (which is complementary to this configuration from the test radio node's point of view), in which the test radio node solely transmits during an interval and otherwise receives no signals, only results in a parameterized hyperbole as position information for the test radio node.

2.3 Configuration: All Radio Nodes Operate as Transceivers

It is understood that the configuration in which all three radio nodes F1, F2, FE operate as transceivers delivers the greatest number of usable reception signals. The set of measurements is based on the determination of three system transfer functions, wherein the distance between the radio nodes can be determined: since the distance between the two reference radio nodes is already known, the measurement can be checked by comparing it with the measurement result. A position determination of the test radio node in the plane is possible with only two distance measurements, wherein two positions fulfill the corresponding distance conditions. The position determination is therefore ambiguous.

The position of the object can be determined via the indirect paths. The length of the respective indirect paths forms the sum of the distances or lengths of the two legs of a triangle, each beginning at the position of the two radio nodes involved and ending in a common point, and resulting in an ellipse (in 3D, of an ellipsoid) on the edge where the object is located. It is therefore only possible to determine the position of the object with regard to an isoline that has the shape of an ellipse. If only the reference nodes are used to determine the position of the object, only an ellipse can be parameterized and thus used to determine the position. If the measurement results that were created with the inclusion of the test node are also used to determine the position, the parameters for three ellipses with different focus points can be determined. The object is located at the intersection of the three ellipses.

2.4 Conclusions

The structure of a system based on radio nodes that operate as transceivers and radio nodes that operate exclusively in a transmit mode or a receive mode allows for a variety of variants, which makes it difficult to predict the system behavior.

The smallest configuration limited to three radio nodes sometimes only allows for limited extraction of position information. It therefore makes sense to increase the number of radio nodes in the reference system in order to increase the reliability of the extracted position information.

However, there are a variety of applications that restrict mobility and access to certain spaces in other ways, for example with walls. In such cases, systems with only two reference radio nodes can provide reliable statements regarding the position of the test node and can support the identification of objects.

3 Description of a Reference Node System for Determining Propagation Properties

3.1 Feature Recognition for Reference Radio Node Systems and Qualified Test Radio Nodes After the possibilities for extracting position information of radio nodes and objects have been presented using system transfer functions, an example of a method in connection with the identification and defense of relay attacks against challenge-response authentication methods will now be explained.

Figure 2:
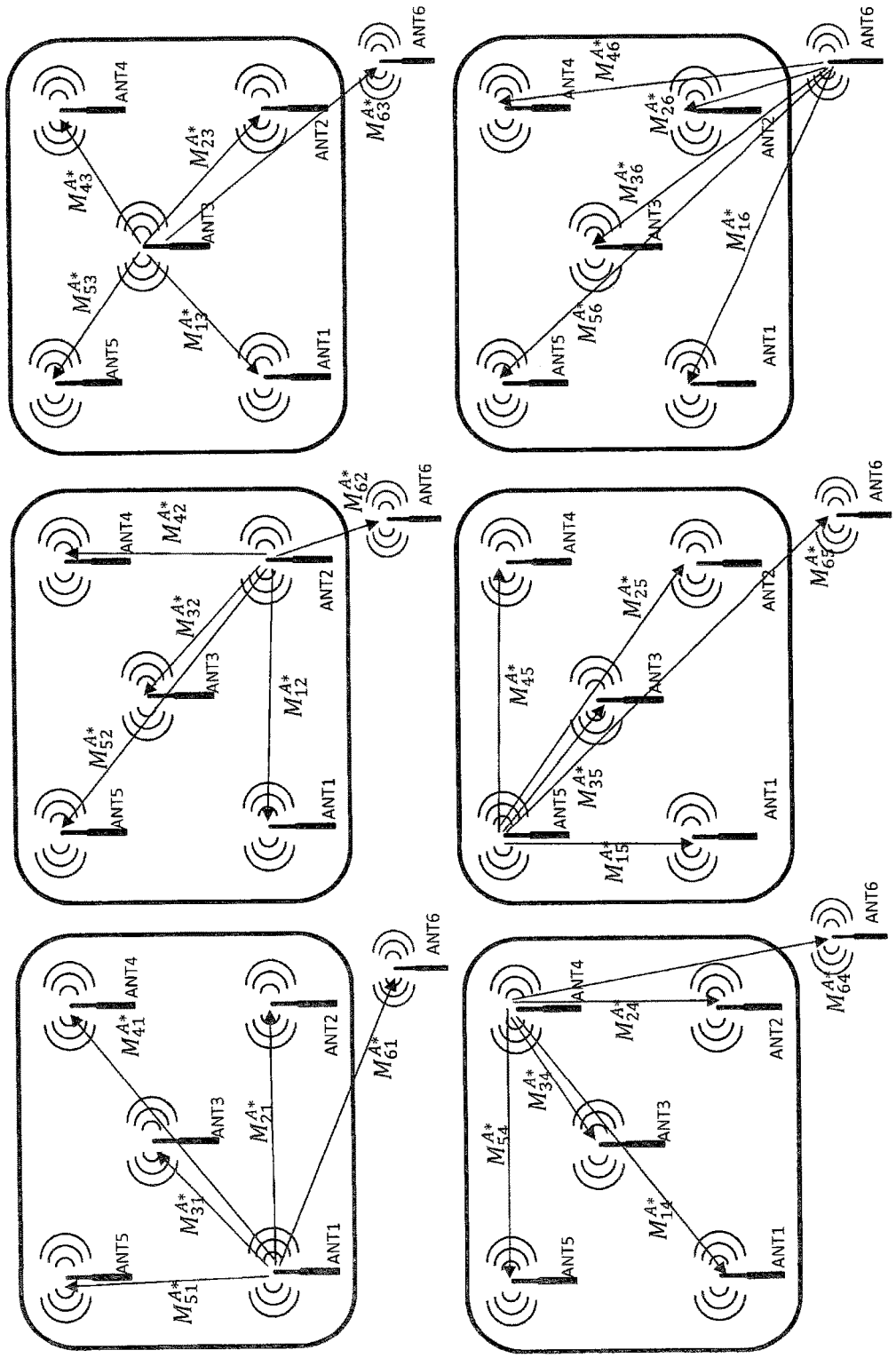
FIG. 2 shows a reference system and test radio.

To measure the propagation properties in the system environment, the antennas (and corresponding transmit/receive functions) are configured such that the system both emits electromagnetic radiation and also receives it. More complex approaches, which involve simultaneous sending and receiving, are part of the method but not part of this exemplary embodiment. In the simplest case, only one antenna is used for transmission, whereas all other antennas operate in the receive mode. FIG. 2 shows a reference system consisting of five reference radio nodes spaced apart from one another and a test radio node, each of which are equipped with an antenna.

To characterize the environment, the antennas ANT1 to ANT5 should be positioned at exposed locations so that they radiate energy mainly into areas that are of particular interest. In turn (round-robin), in each case a reference signal is emitted from one position, which is then received by all other antennas. These received signals are then used to extract the complex signal vectors $M_{ij}^A(j\omega)=f(H_{ij}^A(j\omega), T_{offset,ij}^A, f_{offset,ij}^A)$, wherein the useful signal energy is decisively extracted from the measurement result. The channel transfer function $H_{ij}^A(j\omega)$ as well as the time and frequency offset $T_{offset,ij}^A$, $f_{offset,ij}^A$ between the radio nodes can be determined by the signal vectors. Following completion of all measurements, a matrix $M^A$ is obtained, which summarizes all determined signal vectors $M_{ij}^A(j\omega)=f(H_{ij}^A(j\omega), T_{offset,ij}^A, f_{offset,ij}^A)$:

$$M^A = \begin{bmatrix} M_{11}^A & M_{12}^A & M_{13}^A & M_{14}^A & M_{15}^A \\ M_{21}^A & M_{22}^A & M_{23}^A & M_{24}^A & M_{25}^A \\ M_{31}^A & M_{32}^A & M_{33}^A & M_{34}^A & M_{35}^A \\ M_{41}^A & M_{42}^A & M_{43}^A & M_{44}^A & M_{45}^A \\ M_{51}^A & M_{52}^A & M_{53}^A & M_{54}^A & M_{55}^A \end{bmatrix}$$

As already shown, the channel transfer functions $H_{ij}^A(j\omega)$ are an essential component of the measured values and contain the information about the propagation behavior or the different propagation paths between the nodes i and j. An important property of the channel transfer function is its reciprocal character (transfer behavior is independent of direction), i.e.,:

$$H_{ij}^A(j\omega)=H_{ji}^A(j)$$

This property becomes part of the integrity analysis. Taking these restrictions into account, this property can also be used for the generation of position-specific keys and the implementation of corresponding encryption techniques. The channel impulse responses $h_{ij}^A(t)$ can be derived from the inverse Fourier transform, and via the former, the length of direct and indirect paths can be extracted $h_{ij}^A(t)=F^{-1}\{H_{ij}^A(j\omega)\}$. An alternative to the inverse Fourier transform is the eigenvalue analysis or signal classification.

The elements $M_{ii}^A(j\omega)$ indicate the system property at the respective position, as far as the transmitted and received energy can be separated (high insulating properties required). This creates an image of the transfer function of this antenna to itself. If this property is not implemented, the diagonal elements are all zero.

The system-inherent parameters such as frequency and time offset resulting during extraction require differentiated treatment. The frequency offset, which is largely determined by deviations from the ideal time reference and thus from quartz tolerances, can be regarded as stable over longer periods of time. However, the time offset depends on many unknowns which form a new constellation with each measuring process. Therefore, the calculated time offset is only valid for the length of a measuring process and can be treated as deterministic within this period. In addition, there are other individual parameters that allow for individual recognition of a system component. These mark specific deviations from ideal behavior and can be derived using corresponding models and comparison methods.

A system usually interacts with other components that are part of a larger overall system and should therefore be allowed to access system resources. In the case of an access system, the solution is designed to identify additional objects and to provide them with access to access areas. Through their presence alone (change in the propagation properties due to additional reflections) and their function (emitting electromagnetic radiation, interference radiation), they change or extend the radio environment to a certain extent.

These changes will be considered below. FIG. 2 already shows such an extended radio environment A* using the example of an access system in the presence of a key (qualified component). In this specific case, the influence of the key is to be understood in a broader sense since the key influences the radio environment in connection with its carrier (a person). The carrier of the test radio node can be recognized as an object. A connection is established between the test radio node and the test radio node object represented by the carrier.

The occurrence of a test node and correspondingly associated objects leads to changes in the propagation conditions. In the simplest case, an access system can only conclude that there are changes in the environment if there is a change in the propagation behavior. The extraction of position information as well as motion profiles is also possible for passive objects.

In the active case, all antennas (including the antennas of the additional components) can both send reference signals and receive electromagnetic energy, and the received signals are analyzed, for example, with regard to the useful and interference signal curve and also with regard to the noise properties. The expansion of the system by at least one test radio node leads to an expansion of the matrix of the measurement results.

$$M_{ij}^{A*}(j\omega)=f(H_{ij}^{A*}(j\omega), T_{offs,ij}^{A*}, f_{offs,ij}^{A*}).$$

By including the test radio node in the measuring process, it is possible to expand the features of the radio environment A, so that characteristic features of an extended radio environment A* arise. FIG. 2 shows the expanded measurement options if the test radio nodes, for example test radio nodes contained in keys, are included in the measuring process.

For each additional radio node, the corresponding matrix $M^A$ expands by one row and one column to form a matrix $M^{A*}$:

$$M^{A*} = \begin{bmatrix} M_{11}^{A*} & M_{12}^{A*} & M_{13}^{A*} & M_{14}^{A*} & M_{15}^{A*} & M_{16}^{A*} \\ M_{21}^{A*} & M_{22}^{A*} & M_{23}^{A*} & M_{24}^{A*} & M_{25}^{A*} & M_{26}^{A*} \\ M_{31}^{A*} & M_{32}^{A*} & M_{33}^{A*} & M_{34}^{A*} & M_{35}^{A*} & M_{36}^{A*} \\ M_{41}^{A*} & M_{42}^{A*} & M_{43}^{A*} & M_{44}^{A*} & M_{45}^{A*} & M_{46}^{A*} \\ M_{51}^{A*} & M_{52}^{A*} & M_{53}^{A*} & M_{54}^{A*} & M_{55}^{A*} & M_{56}^{A*} \\ M_{61}^{A*} & M_{62}^{A*} & M_{63}^{A*} & M_{64}^{A*} & M_{65}^{A*} & M_{66}^{A*} \end{bmatrix}$$

The matrix elements $M_{ij}^{A*}(j\omega) = f(H_{ij}^{A*}(j\omega), T_{offset,ij}^{A*}, f_{offset,ij}^{A*})$ are essentially characterized by the channel transfer functions $H_{ij}^{A*}(j\omega)$ and the link-specific time and frequency offset (link means connection between two components).

The channel transfer functions now include the passive changes in the propagation behavior due to the additional components as well as the additional characteristics that result from integration into the measuring process. Accordingly, an expanded matrix of channel impulse responses $h_{ij}^A(t)$ is created, which contains information about the change in propagation paths. It is important to note that the elements of the matrix $M^A$ and the matrix $M^{A*}$ are not independent of one another since the propagation conditions do not change in all aspects. This can be used for feature extraction and corresponding integrity and plausibility tests.

Similar statements also apply for the system-inherent parameters resulting from the extraction such as frequency and time offset, and for individual features of the individual components extracted beyond that.

3.2 Changes in a Radio Environment in the Event of a Relay Attack

Figure 3:
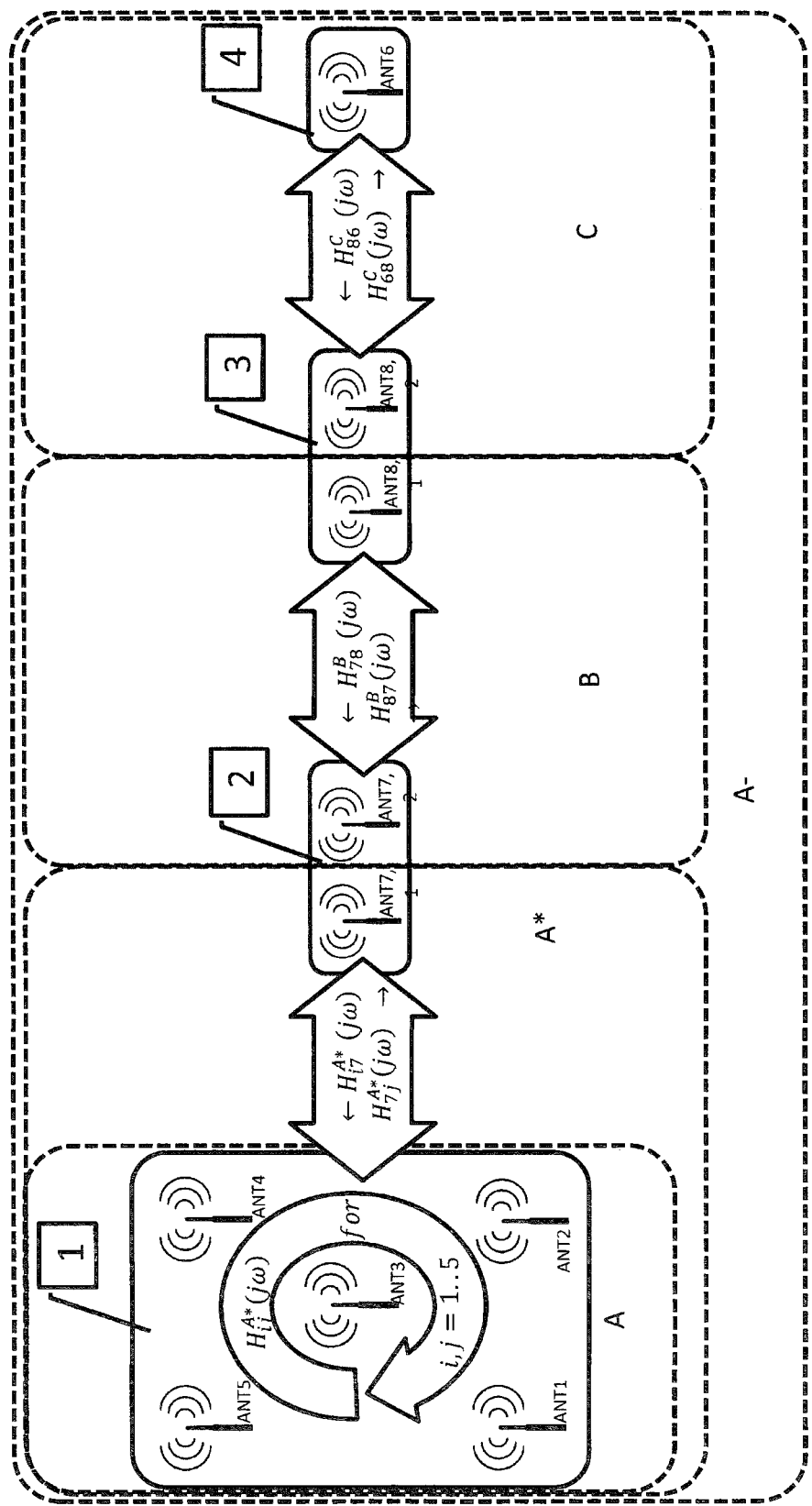
FIG. 3 shows chaining of radio environments in the event of a relay attack.

This section focuses on the changes in the parameters/features of a radio field identification integrity check in the case of a relay attack. Since a relay attack is essentially based on the transfer of signals, this attack should be viewed as a chaining of radio environments, each of which, individually and by way of their interaction, influence the propagation of the reference node signals and the test radio node signals and their evaluation, thus forming a new radio environment. FIG. 3 shows an overview of the constellation in an attack of this type. The result is a radio environment, which is referred to here as A−. It can be seen as a link between the effects of the individual radio environments.

The test radio node ANT6—as a component to be checked for its association/presence in a radio environment—is outside the range of the access system or reference system 1, comprising reference radio nodes ANT1, ANT2, ANT3, ANT4 and ANT5. An attack occurs via a relay system with the attackers 2 and 3, which is spanned by the antennas ANT7.1 and ANT7.2 of the first attacker 2 and the antennas ANT8.1 and ANT8.2 of the second attacker 3. While the first attacker 2 enters the environment of the access system, thereby producing an A* environment characteristic, the second attacker 3 approaches the key owner, that is to say the test radio node ANT 6. A closer look reveals that three radio field environments interact in a relay attack:

the extended environment A* of the access system 1 in the presence of an additional component ANT1-5⇔ANT7.1, which includes properties of the environment A of the access system 1; the first attack system 2 with the antennas ANT7.1 and ANT7.2 produces analog changes of the propagation conditions in the environment A of the access system 1, just like a qualified system (4) would produce them in the case of presence the environment B (ANT7.2⇔ANT8.1) of the relay system between the two attackers 2 and 3, the environment C of the key or test radio node ANT6 (ANT8.2⇔ANT6).

A relay attack, which includes security measures in its strategy (terrorist attack) with respect to time and distance bounding based on the signal vector measurements is focused on mapping the shortest path (as shown in A. R. S. C. Hildur Olafsdottir, "On the Security of Carrier Phase-based Ranging", https://www.researchgate.net/publication/254008732_Physical-layer_attacks_on_chirp-based_ranging_systems, Proceedings of Cryptographic Hardware and Embedded Systems (CHES)). By modifying the signal characteristic, the influence of the phase shift caused by the group delay is compensated for, taking advantage of the periodicity inherent in the method and the associated ambiguity in distance.

This results in a whole series of elements, which are very similar in their properties to the radio environments A and A* and thus form a corresponding link to the extracted features of the environment A for the integrity and plausibility tests. (These basically form the starting point of a feature extraction, in which the access system evaluates the environment.) In addition, configurations are created that connect the radio environments A→A*, B and C to each other via the relay system. On the one hand, information that characterizes the environment A or A* of the access system 1 and the environment B of the relay system 2 and 3 is relocated to the environment C of the key system 4 and received there by the key. On the other hand, information/features of the key radio environment C and the relay radio environment B are transported via the relay system to the reference radio nodes of the access system. The individual radio environments are basically superimposed in their reflection behavior. Key and access system can communicate in encrypted form via the data communication and thereby exchange the most varied results of the feature check with one another, without the relay system being able to influence it. This allows for a coordinated approach when evaluating the various features on both sides (access system and tag).

Before an access request is made by a test radio node, the access system builds up a database and keeps it up to date. This is limited to the radio environment A of the access system 1.

As soon as the system receives an access request, an expanded matrix is created that contains the additional rows and columns that are created when the measuring process is expanded to include the additional key component 4. The results are used for feature extraction and for plausibility testing.

A distinction is made between qualified access and the identification of a relay attack. The measured values determined are evaluated in respect of these two categories. The positive evaluation of the matrix of the extracted (measured) signal vectors with regard to a number of properties/tests leads to a classification of the access request as qualified access. The signal vectors determined correspond to a characteristic of the signal vector matrix $M^{A*}$. In the case of a relay attack, the signal vector matrix determined corresponds to a characteristic of the signal vector matrix $M^{A-}$, whereby a relay attack can be identified based on the corresponding properties/test. These two matrices are fully illustrated in the following equations:

Qualified Access:

$$M^{A*} = \begin{bmatrix} M_{11}^{A*} & M_{12}^{A*} & M_{13}^{A*} & M_{14}^{A*} & M_{15}^{A*} & M_{16}^{A*} \\ M_{21}^{A*} & M_{22}^{A*} & M_{23}^{A*} & M_{24}^{A*} & M_{25}^{A*} & M_{26}^{A*} \\ M_{31}^{A*} & M_{32}^{A*} & M_{33}^{A*} & M_{34}^{A*} & M_{35}^{A*} & M_{36}^{A*} \\ M_{41}^{A*} & M_{42}^{A*} & M_{43}^{A*} & M_{44}^{A*} & M_{45}^{A*} & M_{46}^{A*} \\ M_{51}^{A*} & M_{52}^{A*} & M_{53}^{A*} & M_{54}^{A*} & M_{55}^{A*} & M_{56}^{A*} \\ M_{61}^{A*} & M_{62}^{A*} & M_{63}^{A*} & M_{64}^{A*} & M_{65}^{A*} & M_{66}^{A*} \end{bmatrix}$$

Relay Attack:

$$M^{A-} = \begin{bmatrix} M_{11}^{A-} & M_{12}^{A-} & M_{13}^{A-} & M_{14}^{A-} & M_{15}^{A-} & M_{16}^{A-} \\ M_{21}^{A-} & M_{22}^{A-} & M_{23}^{A-} & M_{24}^{A-} & M_{25}^{A-} & M_{26}^{A-} \\ M_{31}^{A-} & M_{32}^{A-} & M_{33}^{A-} & M_{34}^{A-} & M_{35}^{A-} & M_{36}^{A-} \\ M_{41}^{A-} & M_{42}^{A-} & M_{43}^{A-} & M_{44}^{A-} & M_{45}^{A-} & M_{46}^{A-} \\ M_{51}^{A-} & M_{52}^{A-} & M_{53}^{A-} & M_{54}^{A-} & M_{55}^{A-} & M_{56}^{A-} \\ M_{61}^{A-} & M_{62}^{A-} & M_{63}^{A-} & M_{64}^{A-} & M_{65}^{A-} & M_{66}^{A-} \end{bmatrix}$$

Equivalence on the basis of presence in radio field A: This section initially focuses on the components that display changes in the propagation behavior in the vicinity of the access system.

First, the matrix elements $M_{ij}^{A?}$ for i,j=1 ... 5 are considered.

A* for authorized access, a chaining of 3 transfer functions is created in the event of a relay attack:

ANT1-5⇔ANT71.1→A*

ANT7.2⇔ANT8.1→B

ANT8.2⇔ANT6→C

To map this process in a model, the corresponding channel transfer functions are connected to environments A*, B and C. The changes within the signal vector matrix in the event of a relay attack can thus be represented by the following relationships.

Qualified Access:

$$M^{A*} = \begin{bmatrix} M_{11}^{A*} & M_{12}^{A*} & M_{13}^{A*} & M_{14}^{A*} & M_{15}^{A*} & M_{16}^{A*} \\ M_{21}^{A*} & M_{22}^{A*} & M_{23}^{A*} & M_{24}^{A*} & M_{25}^{A*} & M_{26}^{A*} \\ M_{31}^{A*} & M_{32}^{A*} & M_{33}^{A*} & M_{34}^{A*} & M_{35}^{A*} & M_{36}^{A*} \\ M_{41}^{A*} & M_{42}^{A*} & M_{43}^{A*} & M_{44}^{A*} & M_{45}^{A*} & M_{46}^{A*} \\ M_{51}^{A*} & M_{52}^{A*} & M_{53}^{A*} & M_{54}^{A*} & M_{55}^{A*} & M_{56}^{A*} \\ M_{61}^{A*} & M_{62}^{A*} & M_{63}^{A*} & M_{64}^{A*} & M_{65}^{A*} & M_{66}^{A*} \end{bmatrix}$$

Relay Attack $$M^{A-} = \begin{bmatrix} M_{11}^{A*} & M_{12}^{A*} & M_{13}^{A*} & M_{14}^{A*} & M_{15}^{A*} & M_{17}^{A*} & M_{78}^{B} & M_{86}^{C} \\ M_{21}^{A*} & M_{22}^{A*} & M_{23}^{A*} & M_{24}^{A*} & M_{25}^{A*} & M_{27}^{A*} & M_{78}^{B} & M_{86}^{C} \\ M_{31}^{A*} & M_{32}^{A*} & M_{33}^{A*} & M_{34}^{A*} & M_{35}^{A*} & M_{37}^{A*} & M_{78}^{B} & M_{86}^{C} \\ M_{41}^{A*} & M_{42}^{A*} & M_{43}^{A*} & M_{44}^{A*} & M_{45}^{A*} & M_{47}^{A*} & M_{78}^{B} & M_{86}^{C} \\ M_{51}^{A*} & M_{52}^{A*} & M_{53}^{A*} & M_{54}^{A*} & M_{55}^{A*} & M_{57}^{A*} & M_{78}^{B} & M_{86}^{C} \\ M_{71}^{A*} \cdot M_{87}^{B} \cdot M_{68}^{C} & M_{72}^{A*} \cdot M_{87}^{B} \cdot M_{68}^{C} & M_{73}^{A*} \cdot M_{87}^{B} \cdot M_{68}^{C} & M_{74}^{A*} \cdot M_{87}^{B} \cdot M_{68}^{C} & M_{75}^{A*} \cdot M_{87}^{B} \cdot M_{68}^{C} & & & M_{66}^{A*} \end{bmatrix}$$

Since the subsystem 2 of the relay system (ANT7.1⇔ANT7.2) is in the vicinity of the access system 1, the presence of this system only produces changes in the signal vectors which, in a first order, are plausible changes in the sense of a transition of the radio environment A to a possible environment A* (and thus are part of the feature space of A*). The measurement results, however, very effectively show movements in the area of the access system and thus allow for the extraction of motion profiles. If the analysis is now expanded with an inertial sensor system at the test radio node (e.g., in the key, in a smart phone), plausibility tests can be used to demonstrate to what extent the features of the motion on the key side concur with motion on the access system side, and in this way detect an attack.

Equivalence with respect to the additional elements of the radio field A*: Next, the signal vectors derived with the direct inclusion of the key 4 or the test radio node ANT6 and the relay system 2 and 3 or ANT7.1⇔ ... ANT8.2⇔ are considered. While the key is part of the radio environment Since ANT7.1 of the relay attack system 2 is part of the radio environment A*, the elements $M_{7j}^{A*}$ are part of the space of the qualified elements $M_{6j}^{A*}$ for all j=1..5 and the elements $M_{7j}^{A*}$ are part of the qualified space of the elements $M_{i6}^{A*}$ for all i=1..5.

In contrast thereto, the elements $M_{87}^{B}$ and $M_{78}^{B}$ characterize the propagation conditions within the radio environment B, and the elements $M_{68}^{B}$ and $M_{86}^{B}$ reflect the propagation properties of the radio environment C. When passing through these environments, in addition to the direct path, also the indirect propagation paths existing in these environments are reflected by said environments B and C.

In order to map the distance of the key 4 relative to the access system, corresponding to the environment A*, the phase response must be adapted when using a frequency domain-based method. As described in A. R. S. C. Hildur Olafsdottir, "On the Security of Carrier Phase-based Ranging", https: //www. researchgate.net/publication/ 254008732_Physical-layer_attacks_on_chirp based_ranging_systems, Proceedings of Cryptographic Hardware and Embedded Systems (CHES), this is usually done by exploiting the ambiguity of the phase response, which repeats at multiples of the pitch period (wrap-around distance). With knowledge of the frequency step size, a corresponding delay is inserted that basically shifts the direct propagation path to a range valid for recognizing the environment A*.

However, this correction leaves all the relationships of the original direct path to the existing indirect paths (in the respective radio environments of the relay system B and the key C) untouched, i.e., in the measurement result, all indirect paths of environments B and C appear on the key side and on the access system side. If indirect paths are present in the environments B and C, these result in deviations from valid feature distributions in space A*, which are identifiable by plausibility and integrity testing. A cleanup of the relay signals transmitted in each case to the key or the access system in order to influence the indirect paths of environments B and C (which should occur by a relay system) adds a level of complexity that is greater by several orders of magnitude than the complexity of correcting the direct path.

In addition, influence due to the internal properties of the relay system 2, 3 can be expected:

ANT7.1|ANT7.2
ANT8.1|ANT8.2

On the one hand, it can be expected that other characteristic features such as the device (frequency offset) properties or measuring process-specific properties (time offset) will be influenced by the adjustment of the phase response. Depending on the implementation (e.g., frequency conversion and transfer via radio, active bi-directional cable connection with gain to compensate for free space attenuation, etc.), there are distortions that can be detected.

For detection, it is advisable to perform detection and control of various system parameters in addition to the time and frequency offsets mentioned. The corresponding gain settings of the receivers and transmitters and the determined phase offsets of the oscillators can be used for this purpose. While an attack system modifies the phase response to manipulate the measured direct path, increased tracking of these system and link-dependent parameters increases the demands on the relay system, since all distortions must be kept below the detection threshold.

In conclusion, it should be noted that, in addition to the detectability of inconsistencies with regard to indirect propagation paths, the narrow-band measurement of the round-trip time also sets narrow limits for being able to manipulate the propagation characteristics.

4 Integrity and Plausibility Test for Extended Sets of Features

In the previous sections, radio node and object detection was used in connection with the evaluation of system transfer functions for testing the integrity of the radio environment of a reference system. A corresponding model was initially presented, which enables objects and radio nodes to be mapped in connection with metrologically determined system transfer functions. After that, the derivation of position information based on the propagation paths extracted from the system transfer functions was shown. In addition, an analysis of system transfer functions was shown in the frequency domain. Further, connection-specific parameters such as frequency, time and phase offset were integrated in a feature analysis.

Figure 4:
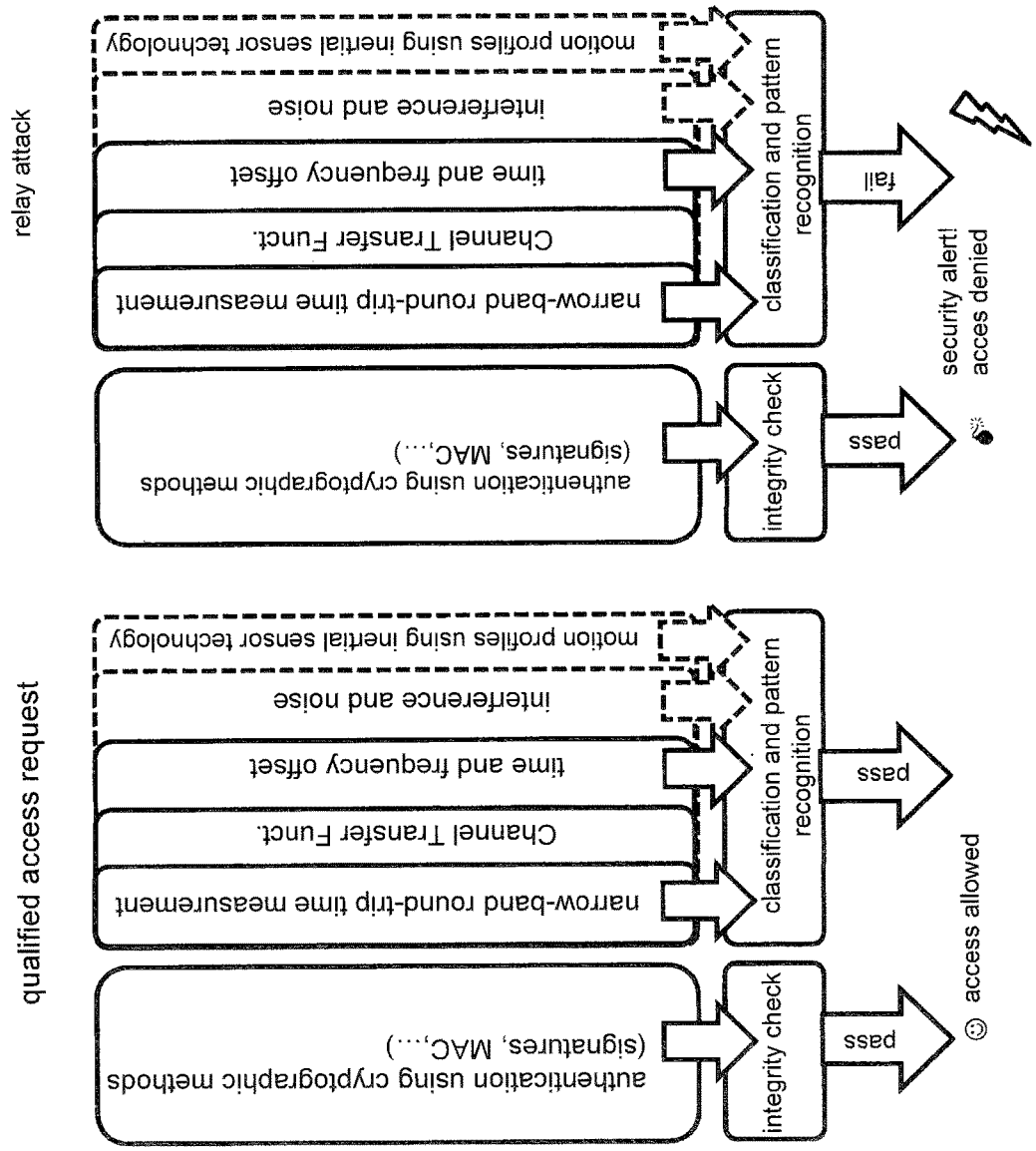
FIG. 4 shows formation of an extended radio environment ID in connection with classification and pattern recognition methods for the identification and defense of relay attacks.

FIG. 4 illustrates how integrity testing of the radio environment, using analysis of transfer functions by radio node and object recognition, increases the security of an access system that utilizes challenge-response based authentication methods.

Simple methods for establishing distance bounding, as is already possible with narrow-band time-based methods for round-trip time measurement, can be enhanced, and security can be increased. An inclusion of the time and frequency offsets determined on the part of the reference system and the test radio node allows for the definition of further relevant tests and thus an increase in the confidence level.

In conjunction with the existing possibilities for absolute time and distance measurement, a feature space is thus created that allows for unambiguous identification of radio nodes within their radio environment. Channel occupancy scans and protocol statistics allow for conclusions to be drawn about interfering field influences and can also be incorporated in the corresponding integrity tests. In addition to the features described here, it is also possible to use further sensors for the extraction of motion profiles. For this purpose, inertial sensor technology is suitable, which detects both the position of an object and its movement.

Classification analyses, such as the support vector machine, can verify the plausibility and integrity of the measurement results and thus the presence of a radio node within an environment.

Extending to the identification of environment-specific objects and radio nodes and the corresponding determination of the position information allows for a reduction in the sensor data for positional relationships and thus the generation of higher quality features that can be included in the integrity check. In addition, the determined measurement data leads to over-determined equation systems that can be used to derive additional quality parameters.

An expansion to detect further objects also strengthens the quality of the classification.

A distinction is made between:

Reference object that is physically connected to the reference radio node,

The test object that is physically connected to the test radio node,

Environment objects in the immediate vicinity of the reference object and the test object.

This procedure allows for the integrity check to be implemented quantitatively and qualitatively. A possible procedure for determining a minimum number of tests to be tested as positive may include the following aspects:

Was an object recognized (at all) by the reference system and were positional relationships (in the simplest case isolines of a distance, a distance difference or also a distance sum or accumulated distance) extracted?

Was an object recognized with the inclusion of the test node or in the measurement results of the test node?

Was the test radio node recognized by the reference system and were positional relationships (in the simplest case isolines of a distance, a distance difference or a distance sum or accumulated distance) extracted?

Object Detection

Does the determined position information of an object match the position information of the test radio node within predetermined tolerances, so that it can be concluded that the object is the test radio node object?

Do the objects determined by the reference system with the inclusion of the reference radio nodes have a meaningful connection to the objects determined by the reference system with the inclusion of the test radio node? E.g.,:

Are additional objects recognized with the inclusion of the test node?

Does the result of the object recognition, with the inclusion of the test radio node, support the results of the object recognition with exclusive use of the reference node? E.g., does the confidence level increase to a position determination or does the confidence level reduce, e.g., with the use of RAIM (receiver autonomous integrity monitoring)

According to the determined position information, is the test node and the test node object located within a predetermined area within the reference node coordinate system?

Is the test node located within a maximum distance from the reference system? (distance bounding)

Is the test node within a zone around a target position? (zoning)

Motion Profiles

Does the confidence level of the object motion profiles determined by the reference system increase with the inclusion of the test radio node in the measuring process or is the confidence level reduced, e.g., by using RAIM (Receiver Autonomous Integrity Monitoring)

Sensor Fusion

Checking of characteristic features of the motion profiles extracted by object and radio node recognition Comparison of the characteristic features of the position-based motion detection upon evaluation of motion profiles using inertial sensor technology.

As a rule, the results that are won exclusively by using the measurement results of the reference radio nodes are compared with the results derived by additionally incorporating the test radio nodes. It can easily be shown that a large number of characteristic sensor data can be determined in this way. The extraction of high-quality features is therefore essential in order to quickly reduce the mass of data to a number of decision criteria. All methods can also be used.

5 Measuring Process

Figure 5:
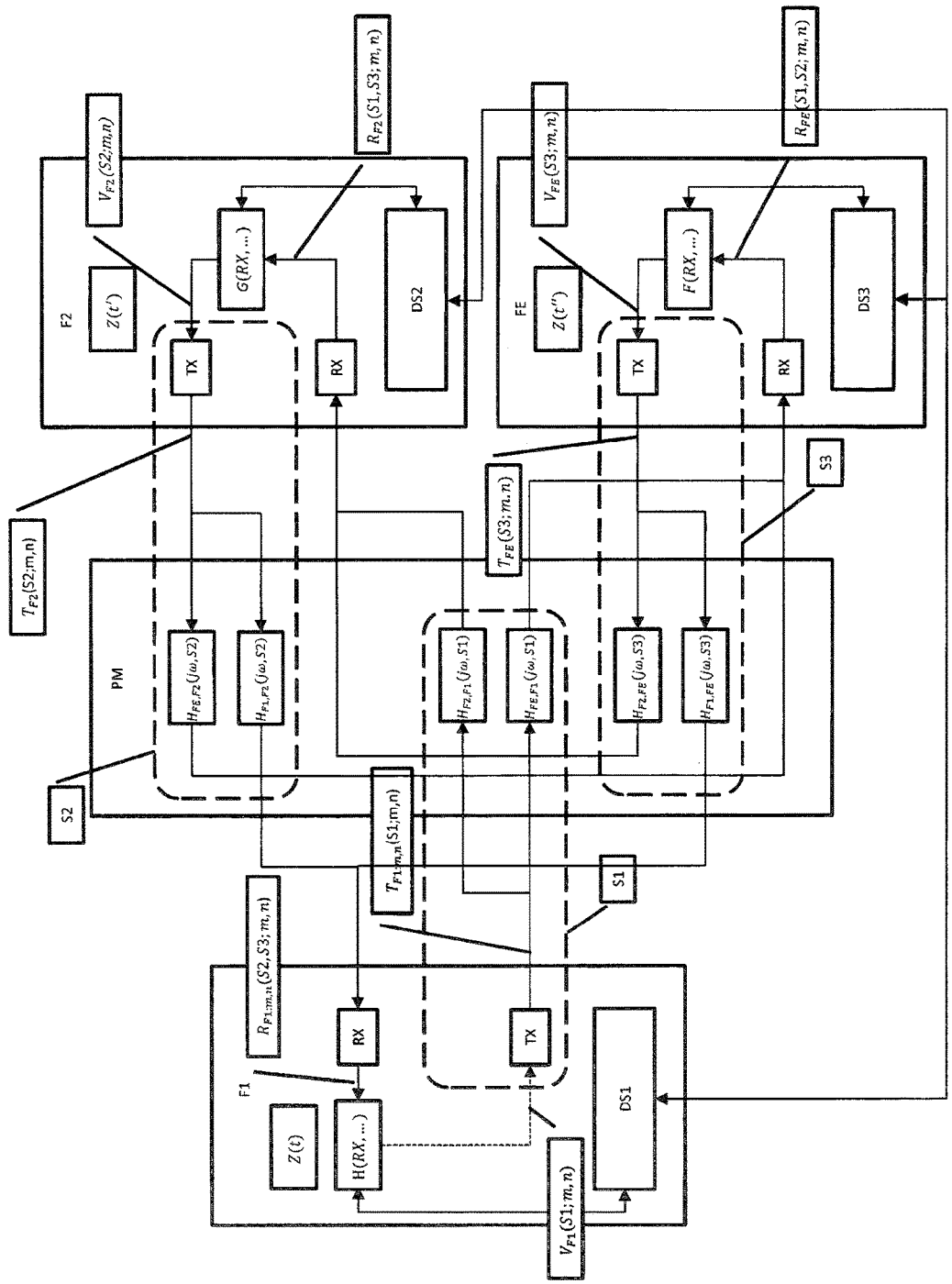
FIG. 5 shows an overview of the measurement constellation.

FIG. 5 schematically shows an arrangement of three radio nodes F1, F2 and FE for performing a further alternative embodiment of the method according to the invention for radio measurement applications. Each of the three radio nodes each has a receiving unit RX, a transmitting unit TX, a data interface DS1 or DS2 or DS3 (can also be identical to the radio interface) and its own timer Z(t) or Z (t') or Z (t"). Further, the radio nodes include a unit which allows for feeding received signal vectors back to the transmitting unit as input signal vectors. The transmission signals are transmitted between the radio nodes via a propagation medium (PM), which is determined by the channel transfer functions.

To distinguish between the radio nodes, the corresponding magnitudes are marked by indents (for example, frequencies and times of $f'_p$, $\omega'_p$, $t'$, . . . ).

The associated timers Z(t), Z(t') Z(t") each comprise a quartz oscillator and specify a time measure for the respective time base t, t' or t" of the respective radio node.

The timers each generate a time reference for sequence control within the respective radio node. The sequence control controls the time response of all relevant function blocks in the respective radio nodes. The sequence control also specifies the times for a frequency change.

It should be noted that the temporal lengths $T_{MU}$, $T'_{MU}$ and $T'''_{MU}$ each denote a predefined smallest time interval, the smallest time interval also being referred to as the measuring unit time $T_{MU}$.

It is assumed that the timers progress in the same units, which are derived from the respective time base. If there is a frequency offset between the timers, the frequency offset must be corrected in order to carry out the method.

Figure 6:
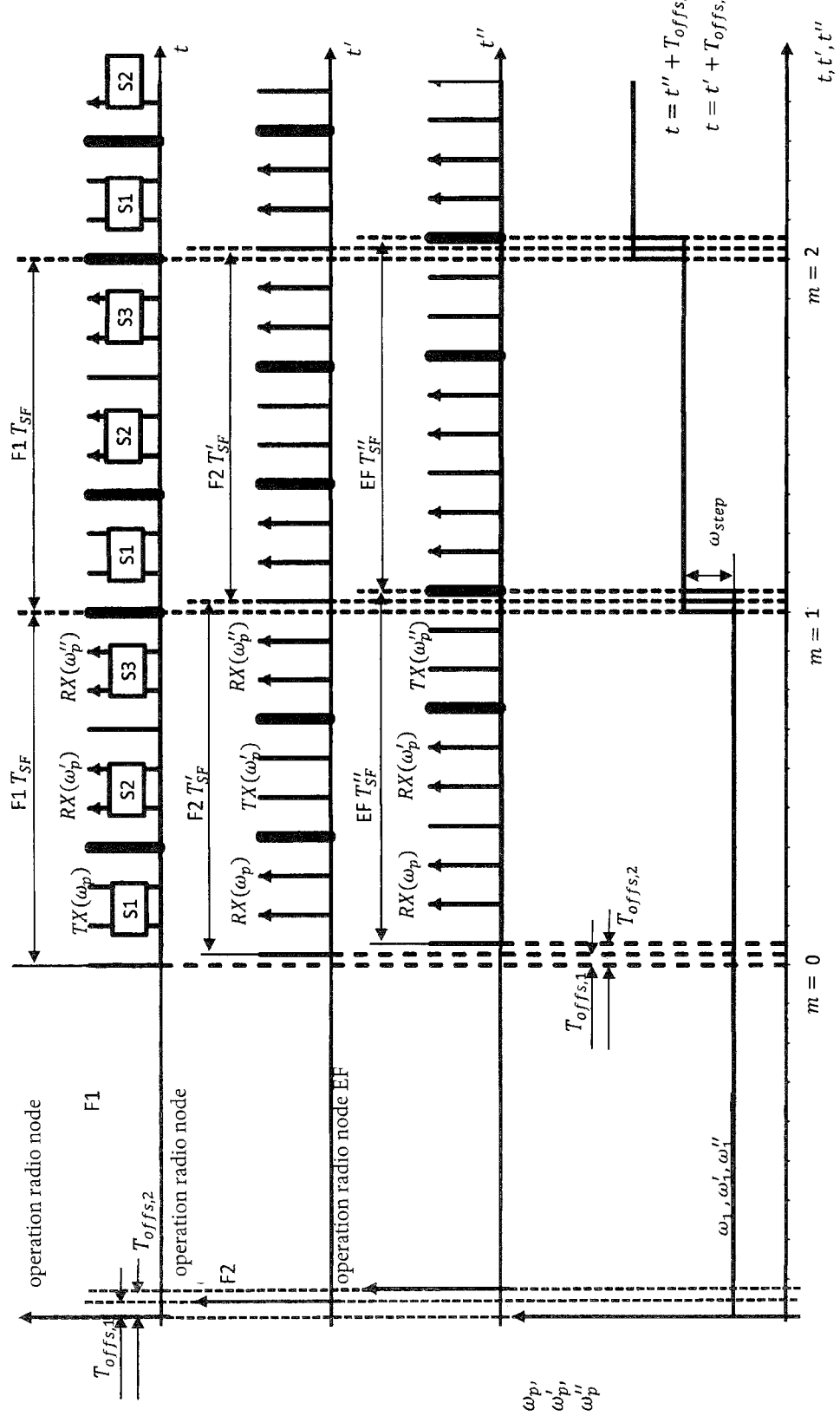
FIG. 6 shows a time measurement sequence.

FIG. 6 illustrates a sequence of the method according to the invention having three radio nodes, via the respective time axis t or t' or t". There is a time offset $T_{offs,1}$ or $T_{offs,2}$ between the individual time bases.

A step sequence consists of three steps, wherein in the first step S1 in the transmit mode, the radio node F1 emits an initial signal $T_{F1}$ which is received by the two radio nodes F2 and FE, in the second step S2, the radio node F2 emits a response signal $T_{F2}$ which is received by the radio node F1 transponder FE, and in the third step S3, the radio node FE emits a response signal $T_{FE}$ which is received by the radio nodes F1 and F2.

The step sequence assumes a time interval $T_{SF}$, is repeated several times, thereby changing the frequency $\omega_p$, $\omega'_p$, $\omega''_p$ by the phase $\omega_{step}$, the index m indicating the repetitions. The transmit signals are coherent at least during a step sequence, i.e., during the time interval $T_{SF}$.

It should be noted that the method includes:

Steps having one or more transmission windows or receive windows for the individual radio nodes, Step sequences comprising at least two steps with a time length $T_{SF}$, $T'_{SF}$ or $T''_{SF}$ of the individual radio nodes, Measurement cycles as a series of steps sequences with a time length $T_Z$, $T'_Z$ or a time length $T''_Z$, Series of measurement cycles.

Each sequence of steps has transmission and receive areas, which are each divided into transmission windows and receive windows. The time length of a transmission or receive window is $T_{MU}$, $T'_{MU}$ or $T''_{MU}$.

It should be noted that the index n indicates the position of the time window within one of the step sequences and has a duration of $T_{SF}=n_{max} \times T_{MU}$. The index has a range of values n=0, 1, . . . ($n_{max}$−1), wherein nmax is calculated from the specific configuration of the measurement cycle.

The index m indicates the position of the sequence of steps within the measurement cycle, wherein m=0,1, . . . ($m_{max}$−1). $m_{max}$ is determined by the specific configuration and depends, among other things, on the number of frequencies for which the transfer function is to be determined. A series of step sequences is called a measurement cycle. A measurement cycle of the radio node F1 has a length of $T_Z=m_{max} \cdot T_{SF}$. A measurement cycle of the radio node F2 has a length of $T'_Z=m_{max} \cdot T'_{SF}$, etc.

With regard to the phase coherence, it is noted that the transmitting and receiving unit of the transponder, together with the timer Z(t) and the time-frequency sequence control, form a phase-coherent domain.

For a required length of time, i.e., for any number of steps, the phase-coherent domain of the radio nodes is characterized by a fixed relationship between the phase position of the transmission signals $T_{FK}$ (m,n) for all indices n within a sequence of steps in which the transmitting unit transmits, and the reference phase for the determination of the receive vectors $R_{FK}$ (m,n) for all indices n within a sequence of steps in which the receive unit receives.

If the phase coherence is limited to a sequence of steps, the coherence length is $T_{SF}$ for the radio node F1 or $T_{SF}$ for the radio node F2, etc. If the phase coherence is expanded to a measurement cycle, the coherence length is $T_Z$ for the radio node F1 or the coherence length is $T'_Z$ for the radio node F2, etc. In the case of a series of measurement cycles, the coherence length is extended accordingly to the time length of the series of measurement cycles.

It is understood that the transition areas, which are characterized by settling processes, are exempt from the requirement for coherence. The requirements regarding the phase coherence of the respective radio nodes result in a phase coherence of the radio nodes to each other, if the timers differ only in a time offset and otherwise both nodes follow the same timing on the basis of $T_{MU}$, $T'_{MU}$ or $T''_{MU}$ and the receive and transmission response is complementary to each other.

The receive units RX of the radio node transfer the received signals into a discrete-time representation. The receive results $R_{F1}$, $R_{F2}$ and $R_{FE}$ are still referred to as receive vectors.

The receive vectors $R_{FK}$ (m,n) assume the form of a complex number, wherein the number is proportional to the magnitude of the received signal and is determined relative to the respective time base at discrete times, e.g., for F2 relative to the time base t' at the times $t'=n \cdot T_{MU}+m \cdot T_{SF}$.

In addition, the transponder FT is designed to determine a signal vector VFK from the received signal $R_{FK}$ with the aid of a function $F(R_{FK}, \ldots)$ and to exchange it using the data interface DS-FK.

For the corresponding representation, the abbreviation FK establishes the relationship to the respective radio node.

In order to be able to perform the first mode of the method according to the invention, the radio nodes are additionally designed to transmit the signal vector $V_{FK}$ to the transmission unit TX and to process them further by means of the transmission unit TX and to generate the next transmission signal based thereon.

The time and frequency control ZFS1 or ZFS2 operates on the basis of a time unit $T_{MU}$ and ensures that all relevant changes of state (sampling of the signal vectors, RX/TX-TX/RX transitions, frequency changes) are permanently connected to the time base specified by the respective timer and can be related to the latter:

The time and frequency control ZFS of the radio nodes is also responsible for ensuring that the coherence between the signals and vectors is maintained over the required length, i.e., taking into account settling processes, and that all functional units are also located in the transition areas of the linear control areas (such as frequency generator, PLL).

As a result, the time and frequency control ZFS in each case generates a phase-coherent domain PD in which the high-frequency synthesis, the generation of the corresponding transmit vectors and the extraction of the receive vectors are phase-related to one another in a fixed relationship.

The repetitions of a sequence of steps form a measurement cycle, wherein m is incremented with each completed sequence of steps and ωp is selected according to the requirements. In the case of a frequency sweep, ωp is increased by $\omega_{step}$ with each measurement cycle.

In the dimensioning, both the respective settling processes and the limits of maximum time offset fluctuations, achievable through coarse synchronization, should be taken into account and the step delay or guard intervals $T_{SV}$ are to be interpreted accordingly.

A discrete-frequency sampling of the system transfer function takes place on the basis of the determined signal vectors. These allow for a separate determination of time and frequency offsets, as well as of the corresponding channel transfer functions.

6 Summary

Published approaches for relay attack strategies on frequency domain-based signal vector measurement systems concentrate solely on the phase characteristics of the direct path. The technology presented, that is, the method according to the invention, however, incorporates the properties of the multipath wave propagation and makes it easy to draw additional conclusions about the distribution of interference energy. In conjunction with radio node-specific properties, such as the frequency offset, and random parameters related to the measuring process, such as the time offset, an expanded set of features is created that uniquely identify an environment.

With the aid of plausibility and integrity testing, including machine learning methods for classification and pattern recognition, these features can be used for secure environment-based authentication and thus successfully detect and ward off relay attacks.

The cost for the analysis and modification of the signals used to perform a successful relay attack is deemed very high and not feasible with today's technical means.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for checking an association of radio nodes and of objects with a radio environment, the method comprising:

providing a radio node set of at least three radio nodes spaced apart from each other, each radio node of the radio node set has a radio interface and a timer, wherein there is a time offset between each timer of the radio nodes, wherein at least two radio nodes of the radio node set are reference radio nodes, a distance between each reference radio node and the other reference radio nodes being known and the reference radio nodes form a reference system with the radio environment, at least one radio node of the radio node set is a test radio node, and an association of the at least one test radio node with the radio environment of the reference system is checked, transmitting and receiving signals during a measuring process of radio nodes of the radio node set;

operating, during the measuring process, at least two radio nodes of the radio node set operate as transceivers and at least one radio node exclusively as a transmitter or exclusively as a receiver or as a transceiver during the measuring process;

determining, in a first evaluation step of an evaluation process, a system transfer function between two radio nodes of the radio node set and/or a time offset between the timers by two radio nodes of the radio node set by received signals;

determining, in a second evaluation step of the evaluation process, on the basis of the system transfer function and/or the time offset from the first evaluation step, at least one distance information between an object in the radio environment of the two radio nodes and the two radio nodes and/or at least one distance information between the two radio nodes as a result;

performing, during the evaluation process, in a first pass, the first evaluation step and the second evaluation step at least once for at least one pair of reference radio nodes;

performing, during the evaluation process, in a second pass, the first evaluation step and the second evaluation step at least once for a test radio node and a reference radio node;

comparing, in the comparison process, at least one result of the first pass of the evaluation process with at least one result of the second pass of the evaluation process; and making a decision as to whether the association of the test radio node and/or the object with the radio environment of the reference system is positive or negative, based on at least one result of the comparison process.

2. The method according to claim 1, wherein, in the second evaluation step, on the basis of the system transfer function and/or the time offset from the first evaluation step, at least one distance information between the two radio nodes is determined.

3. The method according to claim 1, wherein, the measuring process comprises at least two measurement cycles, wherein in each measurement cycle, successively each transceiver transmits a transmission signal having a carrier frequency during a transmission period, and the transmitted transmission signal is received by at least the other transceivers during a receive period, wherein the transmission signals of the transceiver are mutually coherent at least during a measurement cycle, wherein the carrier frequency of each measurement cycle differs from the carrier frequencies of all other measurement cycles, and wherein, if a radio node operates as a transmitter during the measuring process, the at least one transmitter in each case emits a transmission signal having a carrier frequency during at least one additional transmission period, before or during or after one of the measurement cycles, wherein the transmission signal is received by the transceivers.

4. The method according to claim 1, wherein the radio node set comprises at least four radio nodes and at least three radio nodes of the radio node set operate as transceivers during the measuring process.

5. The method according to claim 1, wherein the radio node set comprises at least four radio nodes and during the measuring process at least two radio nodes of the radio node set operate exclusively as transmitters or exclusively as receivers or as transceivers during the measuring process.

6. The method according to claim 1, wherein the radio node set comprises at least four radio nodes and at least three radio nodes of the radio node set form the reference system as reference radio nodes.

7. The method according to claim 3, wherein within each measurement cycle, a second signal transmitted and each subsequent transmission signal is formed from at least part of one of the signals received during the same measurement cycle.

8. The method according to claim 3, wherein during the measuring process, the measurement cycle is repeated a plurality of times and the carrier frequency of the transmission signals for each repetition assumes a predetermined value within the frequency domain and the received signals are determined within a measurement frequency domain.

9. The method according to claim 8, wherein each transmission signal has a bandwidth in the transmission period, and wherein the bandwidth is at most 1% of the measurement frequency domain.

10. The method according to claim 1, wherein in the evaluation process, both in the first pass and in the second pass, in each case a distance information is determined for a plurality of objects and the distance information from the first pass is in each case compared with the corresponding distance information from the second pass.

11. The method according to claim 1, wherein at least the measuring process and the evaluation process are repeated several times and several system transfer functions are determined, a first motion profile of at least one object or of the test radio node is determined on the basis of the results of the first passes and on the basis of the results of a second run, a second motion profile of the object or of the test radio node is determined and the first motion profile is compared with the second motion profile in the comparison process.

12. The method according to claim 1, wherein a first motion profile of the test radio node is determined by means of an inertial sensor and is compared in the comparison process to a second motion profile, wherein the second motion profile is determined based on the results of several first passes and/or on the results of several second passes.

13. The method according to claim 1, wherein at least the measuring process and the first pass of the evaluation process are repeated a plurality of times and in the comparison process, the results of the plurality of first passes are compared with at least one result of the second pass.

* * * * *